US011198754B2

(12) United States Patent
Kramer et al.

(10) Patent No.: US 11,198,754 B2
(45) Date of Patent: Dec. 14, 2021

(54) HEAT-CURING EPOXY RESIN COMPOSITION CONTAINING NON-AROMATIC UREAS AS ACCELERATOR

(71) Applicant: SIKA TECHNOLOGY AG, Baar (CH)

(72) Inventors: Andreas Kramer, Zurich (CH); Jürgen Finter, Zurich (CH); Karsten Frick, Remetschwil (CH); Urs Rheinegger, Zurich (CH); Jan Olaf Schulenburg, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 176 days.

(21) Appl. No.: 16/124,590

(22) Filed: Sep. 7, 2018

(65) Prior Publication Data
US 2019/0002626 A1    Jan. 3, 2019

Related U.S. Application Data

(62) Division of application No. 12/742,391, filed as application No. PCT/EP2008/065542 on Nov. 14, 2008, now abandoned.

(30) Foreign Application Priority Data

Nov. 14, 2007 (EP) ..................... 07120720

(51) Int. Cl.
| | |
|---|---|
| *C09J 163/02* | (2006.01) |
| *C09J 5/06* | (2006.01) |
| *C09J 5/08* | (2006.01) |
| *C08G 59/24* | (2006.01) |
| *C08G 59/40* | (2006.01) |
| *C08G 59/68* | (2006.01) |
| *C08G 18/79* | (2006.01) |
| *C08G 18/12* | (2006.01) |
| *C08G 18/28* | (2006.01) |
| *C08G 18/48* | (2006.01) |
| *C08G 18/69* | (2006.01) |
| *C09D 163/00* | (2006.01) |
| *C09J 163/00* | (2006.01) |
| *C08L 63/00* | (2006.01) |
| *C08L 75/04* | (2006.01) |

(52) U.S. Cl.
CPC .......... *C08G 18/792* (2013.01); *C08G 18/12* (2013.01); *C08G 18/2825* (2013.01); *C08G 18/2865* (2013.01); *C08G 18/4854* (2013.01); *C08G 18/698* (2013.01); *C08G 59/686* (2013.01); *C09D 163/00* (2013.01); *C09J 163/00* (2013.01); *C08L 63/00* (2013.01); *C08L 75/04* (2013.01); *C08L 2666/20* (2013.01); *Y10T 428/31515* (2015.04)

(58) Field of Classification Search
None
See application file for complete search history.

(56) References Cited

U.S. PATENT DOCUMENTS

| | | | |
|---|---|---|---|
| 5,045,363 A | 9/1991 | Almer et al. | |
| 5,280,069 A | 1/1994 | Dobinson et al. | |
| 5,290,857 A | 3/1994 | Ashida et al. | |
| 5,707,439 A | 1/1998 | Takekoshi et al. | |
| 6,197,849 B1 | 3/2001 | Zilg et al. | |
| 2003/0196753 A1 | 10/2003 | Schoenfeld et al. | |
| 2007/0027274 A1 | 2/2007 | Antelmann et al. | |
| 2007/0066721 A1 | 3/2007 | Kramer et al. | |
| 2007/0105983 A1 | 5/2007 | Kramer et al. | |
| 2008/0188609 A1* | 8/2008 | Agarwal | ............ C08L 2666/08 524/504 |

FOREIGN PATENT DOCUMENTS

| | | | | |
|---|---|---|---|---|
| CA | 2510486 A1 * | 7/2004 | .......... C08L 2666/22 | |
| DE | 2 123 033 | 8/1972 | | |
| EP | 1 359 202 A1 | 11/2003 | | |
| EP | 1728825 A1 | 12/2006 | | |
| EP | 1 741 734 A1 | 1/2007 | | |
| JP | S49-93495 A | 9/1974 | | |
| JP | S54-26000 A | 2/1979 | | |
| JP | S56-34723 A | 4/1981 | | |
| JP | S64-87667 A | 3/1989 | | |
| JP | H05-148337 A | 6/1993 | | |
| JP | 2001-106771 A | 4/2001 | | |
| JP | 2001-348418 A | 12/2001 | | |
| JP | 2007-521377 A | 8/2007 | | |
| WO | 2004/055092 A1 | 7/2004 | | |
| WO | 2004/106402 A2 | 12/2004 | | |
| WO | 2005/007720 A1 | 1/2005 | | |
| WO | 2007/003650 A1 | 1/2007 | | |
| WO | 2007/004184 A1 | 1/2007 | | |
| WO | WO-2007025007 A1 * | 3/2007 | .......... C08L 2666/24 | |

OTHER PUBLICATIONS

Brochure from Cardolite (No. date).*
Oct. 5, 2018 Office Action issued in U.S. Appl. No. 12/742,391.
Jul. 31, 2015 Office Action issued in Indian Application No. 1684/KOLNP/2010.
Dec. 5, 2016 Office Action issued in Japanese Application No. 2016-020733.
Nov. 6, 2017 Office Action issued in Japanese Application No. 2016-020733.
Oct. 27, 2014 Office Action issued in Japanese Application No. 2013-147412.

(Continued)

*Primary Examiner* — Michael J Feely
(74) *Attorney, Agent, or Firm* — Oliff PLC

(57) ABSTRACT

Heat-curing epoxy resin compositions are characterized by high impact strength, good storage stability, and a low curing temperature. The epoxy resin compositions are suitable for use as a construction shell adhesive and for producing structural foams. They can already be cured in so-called bottom-baking conditions. Furthermore, it has been found that the use of an accelerator of the formula (Ia) or (Ib) results in an increase of the impact strength of heat-curing epoxy resin compositions.

22 Claims, No Drawings

(56) References Cited

OTHER PUBLICATIONS

Jan. 15, 2013 Office Action issued in Japanese Application No. 2010-533591.
Kawamura, S., Epoxy Resin Molding Material, Apr. 17, 2001, machine translation of JP2001-106771A1.
Feb. 17, 2009 International Search Report issued in International Application No. PCT/EP2008/065542.
Jun. 10, 2010 International Preliminary Report on Patentability issued in International Application No. PCT/EP2008/065542.

* cited by examiner

HEAT-CURING EPOXY RESIN COMPOSITION CONTAINING NON-AROMATIC UREAS AS ACCELERATOR

This application is a divisional application of U.S. patent application Ser. No. 12/742,391 filed May 11, 2010, which in turn is the U.S. national phase of International Application No. PCT/EP2008/065542 filed Nov. 14, 2008, and which claims priority to European Patent Application No. 07120720.3 filed Nov. 14, 2007. The entire disclosures of the foregoing applications are incorporated herein by reference.

TECHNICAL FIELD

The invention relates to the field of heat-curing epoxy resin compositions, more particularly of high-impact heat-curing epoxy resin compositions, more particularly for use as bodyshell adhesive and for producing structural foams.

PRIOR ART

Heat-curing epoxies are long-established resin compositions. For some time now attempts have been undertaken to eliminate or at least greatly reduce the great disadvantage of epoxy resin compositions, namely their brittleness, which leads to the cured epoxy resin composition, under stress, acquiring cracks or suffering destruction. This has already been tried by adding impact modifiers or through chemical modification of epoxy resins.

One important field of use for heat-curing epoxy resin compositions is in vehicle construction, and more particularly in the adhesive bonding or foam filling of cavities in bodyshell construction. In both cases, after the epoxy resin composition has been applied, the body is heated in a cathodic dipcoating oven, in an operation which also cures and, where appropriate, foams the heat-curing epoxy resin composition.

Rapid curing is enabled through the use, routinely, of accelerants in addition to heat-activatable hardeners for epoxy resins. One important category of accelerants are ureas. High-impact heat-curing epoxy resin compositions which may include ureas as accelerants are known from WO-A-2004/055,092, WO-A-2005/007,720, and WO-A-2007/003,650, for example.

In the market at present, however, efforts are in train to lower the temperature of the cathodic dipcoating ovens. Hence within the market there is a great need for heat-curing epoxy resin compositions which cure even at relatively low temperatures, in other words at a temperature of 150 to 170° C., after just a short time, typically 10 to 15 minutes. Consequently, aromatic ureas are used which by virtue of their structure are significantly more reactive. Nevertheless, it has been found that the use of aromatic accelerants of this kind leads to great problems with the storage stability of the heat-curing epoxy resin compositions.

SUMMARY OF THE INVENTION

It is an object of the present invention, therefore, to provide heat-curing epoxy resin compositions, more particularly high-impact heat-curing epoxy resin compositions, which on the one hand have good storage stability at room temperature and on the other hand exhibit rapid curing at temperatures of 170° C. to 160° C., typically at 165° C.

This object has been achieved, surprisingly, by means of a heat-curing epoxy resin composition in accordance with claim 1. This epoxy resin composition can be used to particularly good effect as a one-component heat-curing adhesive, more particularly as a heat-curing one-component bodyshell adhesive in vehicle construction, and also for producing coatings, more particularly paints, and also for producing a structural foam for the reinforcement of cavities, more particularly of metallic structures.

Entirely surprisingly it has also been found that the use of an accelerant of the formula (Ia) or (Ib) leads to an increase in the impact toughness of heat-curing epoxy resin compositions. This applies even in the case of those heat-curing epoxy resin compositions which already possess a considerable degree of impact toughness (measured, for example, as the impact strength to ISO 11343).

Other aspects of the invention are subject matter of other independent claims. Particularly preferred embodiments of the invention are subject matter of the dependent claims.

EMBODIMENTS OF THE INVENTION

The present invention relates to heat-curing epoxy resin compositions which comprise
a) at least one epoxy resin A having on average more than one epoxide group per molecule;
b) at least one epoxy-resin hardener B which is activated by elevated temperature and is an amine, amide, carboxylic anhydride or polyphenol; and
c) at least one accelerant C of the formula (Ia) or (Ib)

In formula (Ia) for the accelerant C, $R^1$ is H or an n-valent aliphatic, cycloaliphatic or araliphatic radical.
Additionally, $R^2$ and $R^3$
either
each independently of one another are an alkyl group or aralkyl group;
or
together are a divalent aliphatic radical having 3 to 20 C atoms which is part of an optionally substituted heterocyclic ring having 5 to 8, preferably 6, ring atoms.
Finally, n is from 1 to 4, more particularly 1 or 2.
In formula (Ib) for the accelerant C, $R^{1'}$ is an n'-valent aliphatic, cycloaliphatic or araliphatic radical.
$R^{2'}$ is an alkyl group or aralkyl group or alkylene group.
$R^{3'}$ independently at each occurrence is H or an alkyl group or aralkyl group.
Finally, n' is from 1 to 4, more particularly 1 or 2.
The term "independently of one another" or "independently at each occurrence" in the definition of groups and radicals means that two or more groups which occur that are referred to identically in the formula may in each case have different definitions.

An "araliphatic radical" is understood in this document tp be an aralkyl group, i.e., an alkyl group which is substituted by aryl groups (cf. Römpp, CD Römpp Chemie Lexikon, Version 1, Stuttgart/New York, Georg Thieme Verlag 1995).

It is essential to the invention that, if $R^1$ is not H, $R^1$ is an n-valent aliphatic, cycloaliphatic or araliphatic radical and is not an aromatic or heteroaromatic radical. In other words, the accelerant C in particular does not have the formula (I').

It is also essential that, if $R^{3'}$ is not H, $R^{3'}$ is not an aromatic or heteroaromatic radical, i.e., the accelerant C in particular does not have the formula (I'').

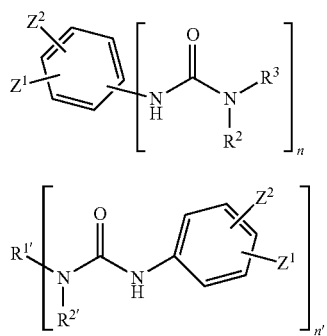

where $Z^1$ and $Z^2$ are H or any desired organic radical.

It has been found that accelerants with aromatic radicals $R^1$ are not storage-stable—that is, they increase the viscosity of heat-curing epoxy resin compositions within a short time, to a degree which is no longer negligible as far as the handling of the composition is concerned.

$R^1$ is more particularly a radical of an aliphatic, cycloaliphatic or araliphatic mono-, di-, tri- or tetraisocyanate of the formula (III), after removal of the n Isocyanate groups.

$$R^1[NCO]_n \quad (III)$$

This mono-, di-, tri- or tetraisocyanate of the formula (III) is either a monomeric mono-, di-, tri- or tetraisocyanate or a dimer or oligomer of one or more monomeric di- or triisocyanates, with dimers or oligomers being more particularly biurets, isocyanurates, and uretdiones.

Suitable monomeric monoisocyanates are alkyl isocyanates, such as, for example, butyl isocyanate, pentyl isocyanate, hexyl isocyanate, octyl isocyanate, decyl isocyanate, and dodecyl isocyanate, and also cyclohexyl isocyanate, methylcyclohexyl isocyanate, and benzyl isocyanate.

Particularly suitable monomeric diisocyanates are 1,4-butane diisocyanate, hexamethylene diisocyanate (HDI), isophorone diisocyanate (IPDI), trimethylhexamethylene diisocyanate (TMDI), 2,5- or 2,6-bis(isocyanato-methyl)bicyclo[2.2.1]heptane, dicyclohexylmethyl diisocyanate ($H_{12}$MDI), m-tetramethylxylylene diisocyanate (TMXDI), and m-xylylene diisocyanate (XDI) and hydrogenated m-xylylene diisocyanate ($H_8$XDI).

Particularly suitable dimers or oligomers are HDI biuret, HDI isocyanurate, IPDI biuret, IPDI isocyanurate, HDI diuretdione, IPDI isocyanurate.

Dimers or oligomers of this kind are available commercially, for example, as Desmodur N-100 (Bayer), Luxate HDB 9000 (Lyondell), Desmodur N-3300 (Bayer), Desmodur N-3600 (Bayer), Luxate HT 2000 (Lyondell), Desmodur N-3400 (Bayer), Luxate HD 100 (Lyondell), Desmodur Z 4470 (Bayer), Vestanat T 1890/100 (Hüls) or Luxate IT 1070 (Lyondell).

Of course, suitable mixtures of the stated di- or triisocyanates can also be used.

$R^1$ is more particularly
alternatively
an alkylene group having 4 to 10 carbon atoms, more particularly a hexamethylene group,
or is

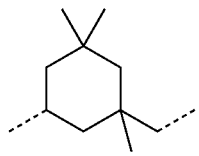

or
is a biuret or an isocyanurate of an aliphatic or araliphatic diisocyanate, following removal of the isocyanate groups;
or
is a xylylene group, more particularly a m-xylylene group.

Particular preferred as $R^1$ is HDI, IPDI, HDI biuret, and XDI, following removal of the NCO groups.

$R^2$ and $R^3$ particularly suitably together form a butylene, pentamethylene or hexamethylene group, preferably a pentamethylene group.

Preferably, $R^2$ and $R^3$ independently of one another are each an alkyl group having from 1 to 5 carbon atoms, more particularly each independently of one another a methyl, ethyl or propyl group, preferably each a methyl group.

$R^1$ in one embodiment is H. This is preferred in the case where $R^2$ and $R^3$ independently of one another are each a methyl, ethyl or propyl group, preferably each a methyl group.

$R^1$ with particular preference is an n-valent aliphatic, cycloaliphatic or araliphatic radical.

$R^{1'}$ is first more particularly a diamine which is selected from the group consisting of 1,4-diaminobutane, hexamethylenediamine, isophoronediamine, trimethylhexamethylenediamine, 2,5- or 2,6-bis(aminomethyl)bicyclo[2.2.1]-heptane, dicyclohexylmethyldiamine, m-tetramethylxylylenediamine, and m-xylylenediamine, hydrogenated m-xylylenediamine, ethylenediamine, 1,3-propanediamine, and 1,2-propanediame, after the removal of the two amino groups.

$R^{2'}$ is first more particularly a $C_1$-$C_{10}$ alkyl radical or an aralkyl radical having 7 to 20 C atoms, preferably a methyl, ethyl, propyl, butyl or pentyl group.

$R^{1'}$ is secondly more particularly an ethylene, propylene, butylene, methylethylene or 1,2-dimethylethylene group.

$R^{2'}$ is secondly more particularly an ethylene, propylene, butylene, methylethylene or 1,2-dimethylethylene group.

The two alkylene groups $R^{1'}$ and $R^{2'}$, together with the urea nitrogen atoms, form a ring, more particularly piperazine or 2,3,5,6-tetramethylpiperazine or homopiperazine (1,4-diazacycloheptane).

$R^{3'}$ is more particularly a monomeric monoisocyanate which is selected from the group consisting of butyl isocyanate, pentyl isocyanate, hexyl isocyanate, octyl isocyanate, decyl isocyanate, and dodecyl isocyanate, and also cyclohexyl isocyanate, methylcyclohexyl isocyanate, and benzyl isocyanate.

The accelerants C of the formula (Ia) are readily accessible synthetically from the reaction of an aliphatic, cycloaliphatic or araliphatic mono-, di-, tri- or tetraisocyanate of the formula (III) with a secondary amine of the formula (IV).

(III)

(IV)

In a second variant of the synthesis, the accelerant C of the formula (Ia) is prepared from the reaction of a primary aliphatic, cycloaliphatic or araliphatic amine of the formula (V) and of a compound of the formula (VI).

$R^1[NH_2]_n$ (V)

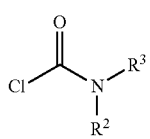
(VI)

Latter variant is advantageous more particularly when polyisocyanates of the formula (III) are unavailable or difficult to obtain commercially.

The accelerants C of the formula (Ib) are readily accessible synthetically from the reaction of an aliphatic, cycloaliphatic or araliphatic monoisocyanate of the formula (IIIa) with a secondary amine of the formula (IVa) or (IVb).

$R^{3'}NCO$ (IIIa)

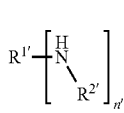
(IVa)

-continued

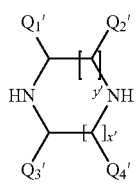
(IVb)

In formula (IVb) x' and y' each independently of one another are 1, 2, 3, 4 or 5 and the substituents $Q^{1'}$, $Q^{2'}$, $Q^{3'}$, and $Q^{4'}$ are independently of one another each H or a $C_1$— to $C_5$ alkyl group. Preferably x' and y' are 1 or 2, preferably each 1; in other words, the secondary amine of the formula (IVb) is preferably piperazine or 2,3,5,6-tetramethylpiperazine or homopiperazine (1,4-diazacycloheptane), more preferably piperazine or 2,3,5,6-tetramethyl-piperazine.

The secondary amines of the formula (IVa) may be prepared in their turn, more particularly, easily from the alkylation of primary amines of the formula $R^{1'}[NH_2]_{n'}$.

Particularly preferred amines of the formula (IVa) are selected from the group consisting of N,N'-dimethyl-1,2-diaminocyclohexane, N,N'-dimethylethylenediamine, N,N'-dimethyl-1,3-propanediamine, bis-isopropylated IPDA (Jefflink 754 (Huntsman)), N,N'-diisobutylethylenediamine, and N-ethyl-N'-methylethylenediamine.

The accelerant C has more particularly a molecule of less than 1,000 g/mol, more particularly between 80 and 800 g/mol. If the molecular weight is greater, the accelerant effect is reduced and the amount required for use is significantly higher, a factor which in turn may lead to poorer mechanical properties.

The amount of accelerant C is advantageously 0.01%-6.0%, more particularly 0.02%-4.0%, preferably 0.02%-2.0%, by weight, based on the weight of the epoxy resin A.

The heat-curing epoxy resin composition further comprises at least one epoxy resin A having on average more than on epoxide group per molecule. The epoxide group takes the form preferably of a glycidyl ether group. The epoxy resin A having on average more than one epoxide group per molecule is preferably a liquid epoxy resin or a solid epoxy resin. The term "solid epoxy resin" is very well known to a person skilled in the epoxide art and is used in contrast to "liquid epoxy resins". The glass transition temperature of solid resins is above room temperature—that means they can be comminuted to pourable particles at room temperature.

Preferred solid epoxy resins have the formula (A-I)

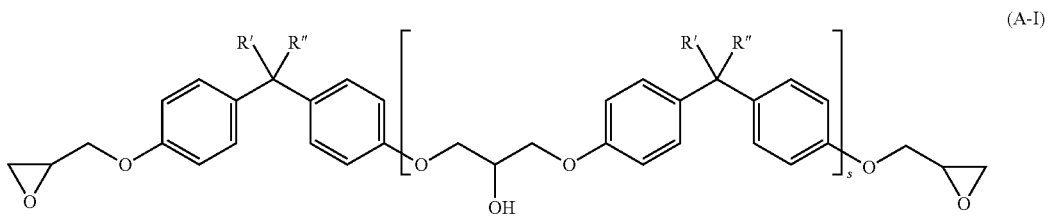
(A-I)

In this formula the substituents R' and R" independently of one another are either H or $CH_3$.

Moreover, the index s is >1.5, more particularly from 2 to 12.

Solid epoxy resins of this kind are available commercially, for example, from Dow or Huntsman or Hexion.

Compounds of the formula (A-I) with an index s of between 1 and 1.5 are referred to by the person skilled in the art as semisolid epoxy resins. For the purposes of the present invention they are considered likewise to be solid resins.

Preference, however, is given to epoxy resins in the narrower sense, in other words where the index s has a value of >1.5.

Preferred liquid epoxy resins have the formula (A-II)

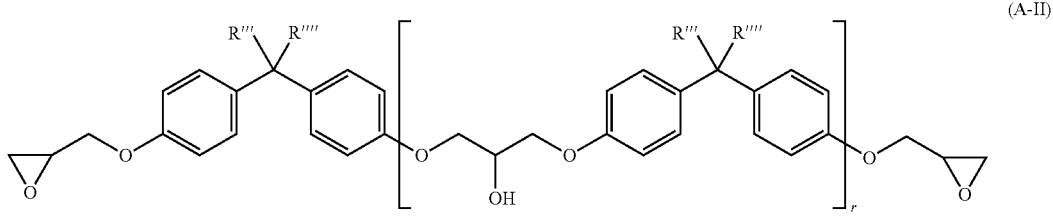

In this formula the substituents R''' and R'''' independently of one another are either H or CH$_3$. Moreover, the index r is from 0 to 1. Preferably r is less than 0.2.

The resins in question are therefore, preferably, diglycidyl ethers of bisphenol A (DGEBA), of bisphenol F, and of bisphenol-A/F (the designation "A/F" refers here to a mixture of acetone with formaldehyde, used as a reactant in its preparation). Liquid resins of this kind are available, for example, as Araldite® GY 250, Araldite® PY 304, Araldite® GY 282 (Huntsman) or D.E.R.™ 331 or D.E.R.™ 330 (Dow) or Epikote 828 (Hexion).

The epoxy resin A is preferably a liquid epoxy resin of the formula (A-II). In an even more preferred embodiment, the heat-curing epoxy resin composition comprises not only at least one liquid epoxy resin of the formula (A-II) but also at least one solid epoxy resin of the formula (A-I).

The fraction of epoxy resin A is preferably 10%-85%, more particularly preferably 15%-70%, preferably 15%-60%, by weight, of the weight of the composition.

The heat-curing epoxy resin composition further comprises at least one epoxy-resin hardener B which is activated by elevated temperature and is an amine, amide, carboxylic anhydride or polyphenol.

Amines are considered to include amines in quaternary form such as, for example, boron halide-ammonium salts of amines.

Hardeners of this kind are very well known to a person skilled in the art. Preferred amines are biguanides or 3,3'- or 4,4'-diaminodiphenyl sulfone or mixtures thereof. Preferred amides are the dihydrazides of adipic acid or sebacic acid. Preferred carboxylic anhydrides are pyromellitic dianhydride or the salts of pyromellitic dianhydride with imidazoles, of the kind available commercially, for example, as Vestagon® B55 from Degussa; trimellitic anhydride or derivatives or trimellitic anhydride, of the kind available commercially, for example, as Aradur® 3380 from Huntsman. Preferred polyphenols are phenolnovolaks or cresol novolaks, of the kind available commercially, for example, as Aradur® 3082 from Huntsman.

More particularly the hardener in question is one of the hardeners B which is selected from the group consisting of diaminodiphenol sulfone, adipic dihydrazide, derivatives of trimellitic anhydride, novolaks, and dicyandiamide.

The most preferred hardener B is dicyandiamide.

The amount of the epoxy resin hardener B which is activated by elevated temperature is advantageously 0.1%-30%, more particularly 0.2%-10%, by weight, based on the weight of the epoxy resin A.

The heat-curing epoxy resin composition further comprises preferably at least one toughness improver D.

By a "toughness improver" is meant, in this document, an addition to an epoxy resin matrix that added even at low levels of 0.1%-50%, more particularly 0.5%-40%, by weight, produces a significant increase in toughness and is therefore capable of accommodating higher flexural, tensile, impact or jolting stress before the matrix tears or ruptures.

The toughness improver D may be a solid or a liquid toughness improver.

In a first embodiment, solid toughness improvers are organic, ion-exchanged laminar minerals. Toughness improvers of this kind are described in U.S. Pat. No. 5,707,439 or in U.S. Pat. No. 6,197,849, for example. Particularly suitable solid toughness improvers of this kind are known to a person skilled in the art by the term organoclay or nanoclay and are available commercially, for example, under the group names Tixogel® or Nanofil® (SOdchemie), Cloisite® (Southem Clay Products) or Nanomer® (Nanocor Inc.) or Garamite® (Southern Clay Products).

In a second embodiment, solid toughness improvers are block copolymers The block copolymer is obtained, for example, from an anionic or controlled free-radical polymerization of methacrylic ester with at least one other monomer containing an olefinic double bond. Preferred monomers containing an olefinic double bond are more particularly those in which the double bond is conjugated directly with a heteroatom or with at least one further double bond. Suitable more particularly are those monomers selected from the group encompassing styrene, butadiene, acrylonitrile, and vinyl acetate. Preference is given to acrylic ester/styrene/acrylonitrile copolymers (ASA), obtainable, for example, under the name GELOY 1020 from GE Plastics.

Particularly preferred block copolymers are block copolymers of methyl methacrylate, styrene, and butadiene. Block copolymers of this kind are available, for example, as triblock copolymers under the group designation SBM from Arkema.

In a third embodiment, solid toughness improvers are core-shell polymers. Core-shell polymers are composed of an elastic core polymer and a rigid shell polymer. Particularly suitable core-shell polymers are composed of a core of elastic acrylate polymer or butadiene polymer, surrounded by a rigid shell of a rigid thermoplastic polymer. This core-shell structure either forms spontaneously by separation of a block copolymer, or is imposed by the polymerization regime as a latex or suspension polymerization with subsequent grafting. Preferred core-shell polymers are so-called MBS polymers, which are available commercially under the tradename Clearstrength™ from Atofina, Paraloid™ from Rohm and Haas or F-351™ from Zeon.

Particular preference is given to core-shell polymer particles already in the form of a dried polymer latex. Examples thereof are GENIOPERL M23A from Wacker, with polysiloxane core and acrylate shell, radiation-crosslinked rubber particles of the NEP series, produced by Eliokem, or Nanoprene from Lanxess or Paraloid EXL from Rohm and Haas.

Further comparable examples of core-shell polymers are offered under the name Albidur™ by Nanoresins AG, Germany.

In a fourth embodiment, solid toughness improvers are solid reaction products of a solid carboxylated nitrile rubber with excess epoxy resin.

Liquid toughness improvers are preferably liquid rubbers or liquid toughness improvers based on a polyurethane polymer.

In a first embodiment the liquid rubber is an acrylonitrile/butadiene copolymer which is terminated with carboxyl groups or (meth)acrylate groups or epoxide groups, or is a derivative thereof.

Liquid rubbers of this kind are available commercially, for example, under the name Hycar® CTBN and CTBNX and ETBN from Nanoresins AG, Germany. Suitable derivatives are more particularly elastomer-modified polymers containing epoxide groups, of the kind sold commercially under the product line Polydis®, preferably from the product line Polydis® 36, from Struktol® (Schill+Seilacher Group, Germany) or under the product line Albipox (Nanoresins, Germany).

In a second embodiment this liquid rubber is a liquid polyacrylate rubber which is fully miscible with liquid epoxy resins and which separates to form microdroplets only when the epoxy resin matrix is cured. Liquid polyacrylate rubbers of this kind are available, for example, under the designation 20208-XPA from Rohm and Haas.

In a third embodiment this liquid rubber is a polyether amide which is terminated with carboxyl groups or epoxide groups. Polyamides of this kind are prepared more particularly from the reaction of amino-terminated polyethylene ether or polypropylene ether, of the kind sold, for example, under the name Jeffamine® by Huntsman, with dicarboxylic anhydride, and subsequent reaction with epoxy resins, of the kind described. for example, in example 15 in conjunction with example 13 of DE 2123033. Instead of dicarboxylic anhydride it is also possible to use hydroxybenzoic acid or hydroxybenzoates.

To a person skilled in the art it is clear that, of course, mixtures of liquid rubbers can also be used, more particularly mixtures of carboxyl- or epoxide-terminated acrylonitrile/butadiene copolymers or of derivatives thereof.

The toughness improver D is preferably selected from the group consisting of blocked polyurethane polymers, liquid rubbers, epoxy resin-modified liquid rubbers, and core-shell polymers.

In one preferred embodiment the toughness improver D is a blocked polyurethane polymer of the formula (II).

In this formula m and m' are each between 0 and 8, with the proviso that m+m' is from 2 to 8.

Moreover, $Y^1$ is a linear or branched polyurethane polymer PU1 terminated with m+m' isocyanate groups, following the removal of all of the terminal isocyanate groups.

$Y^2$ is independently at each occurrence a blocking group which is eliminated at a temperature above 100° C.

$Y^3$ is independently at each occurrence a group of the formula (II).

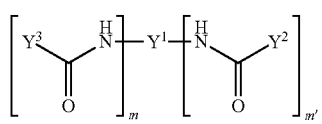

In this formula $R^4$ first is a radical of an aliphatic, cycloaliphatic, aromatic or araliphatic epoxide which contains a primary or secondary hydroxyl group, following the removal of the hydroxide and epoxide groups, and p is 1, 2 or 3.

$Y^2$ is more particularly, independently at each occurrence, a substituent which is selected from the group consisting of

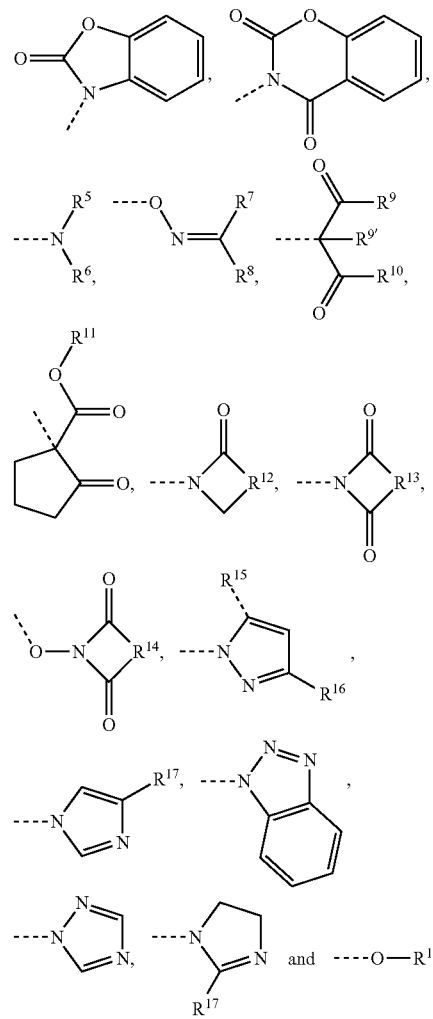

In these groups, $R^5$, $R^6$, $R^7$, and $R^8$ are each independently of one another an alkyl or cycloalkyl or aralkyl or arylalkyl group or else $R^5$ together with $R^6$, or $R^7$ together with $R^8$, forms part of a 4- to 7-membered ring which if desired is substituted.

Furthermore, $R^9$, $R^{9'}$, and $R^{10}$ each independently of one another is an alkyl or aralkyl or arylalkyl group or is an alkyloxy or aryloxy or aralkyloxy group, and $R^{11}$ is an alkyl group.

$R^{13}$ and $R^{14}$ are each independently of one another an alkylene group having 2 to 5 C atoms which optionally has double bonds or is substituted, or are a phenylene group or are a hydrogenated phenylene group, and $R^{15}$, $R^{16}$, and $R^{17}$ are each independently of one another H or an alkyl group or an aryl group or an aralkyl group.

Finally, $R^{18}$ is an aralkyl group or is a mono- or polycyclic substituted or unsubstituted aromatic group which optionally contains aromatic hydroxyl groups.

The dashed lines in the formulae in this document represent in each case the bond between the substituent in question and the associated molecule remainder.

Considered as $R^{18}$ are, in particular, first phenols or bisphenols following removal of a hydroxyl group. Preferred examples of such phenols and bisphenols are, in particular, phenol, cresol, resorcinol, pyrocatechol, cardanol (3-pentadecylphenol (from Cashew Nut Shell Oil)), nonylphenol, phenols reacted with styrene or with dicyclopentadiene, bisphenol A, bisphenol F, and 2,2'-diallylbisphenol A.

Also considered as $R^{18}$ are, in particular, hydroxybenzyl alcohol and benzyl alcohol following removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, it is more particularly a linear or branched $C_1$-$C_{20}$ alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, said group is more particularly a methylene-bonded aromatic group, more particularly a benzyl group.

If $R^5$, $R^6$, $R^7$, $R^8$, $R^9$, $R^{9'}$ or $R^{10}$ is an alkylaryl group, then it is more particularly a phenylene-attached $C_1$ to $C_{20}$ alkyl group, such as tolyl or xylyl, for example.

Particularly preferred radicals $Y^2$ are radicals which are selected from the group consisting of

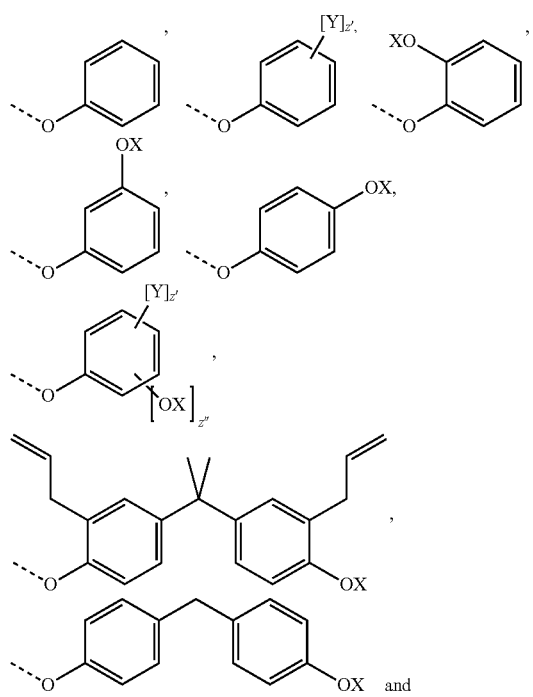

The radical Y here is a saturated or olefinically unsaturated hydrocarbon radical having 1 to 20 C atoms, more particularly having 1 to 15 C atoms. Preferred Ys are more particularly allyl, methyl, nonyl, dodecyl or an unsaturated $C_{15}$ alkyl radical having 1 to 3 double bonds.

The radical X is H or is an alkyl, aryl or aralkyl group, more particularly H or methyl.

The indices z' and z" are 0, 1, 2, 3, 4 or 5, with the proviso that the sum z'+z" is between 1 and 5.

The blocked polyurethane polymer of the formula (II) is prepared from the isocyanate group-terminated linear or branched polyurethane polymer PU1 with one or more isocyanate-reactive compounds $Y^2H$ and/or $Y^3H$. If two or more such isocyanate-reactive compounds are used, the reaction may take place sequentially or with a mixture of these compounds.

The reaction takes place such that the one or more isocyanate-reactive compounds $Y^2H$ and/or $Y^3H$ are used stoichiometrically or in stoichiometric excess in order to ensure that all of the NCO groups are reacted.

The isocyanate-reactive compounds $Y^3H$ is a monohydroxyl epoxide compound of the formula (IIIa).

(IIIa)

If two or more such monohydroxyl epoxide compounds are used, the reaction may take place sequentially or may take place with a mixture of these compounds.

The monohydroxyl epoxide compound of the formula (IIa) has 1, 2 or 3 epoxide groups. The hydroxyl group of this monohydroxyl epoxide compound (IIIa) may represent a primary or a secondary hydroxyl group.

Monohydroxyl epoxide compounds of this kind can be produced, for example, by reacting polyols with epichlorohydrin. Depending on reaction regime, the reaction of polyfunctional alcohols with epichlorohydrin also produces the corresponding monohydroxyl epoxide compounds, as by-products, in different concentrations. These compounds can be isolated by means of typical separating procedures. Generally speaking, however, it is sufficient to use the product mixture which is obtained in the glycidylation reaction of polyols and which is composed of polyol having undergone full reaction and partial reaction to form the glycidyl ether. Examples of such hydroxyl-containing epoxides are butanediol monoglycidyl ether (present in butanediol diglycidyl ether), hexanediol monoglycidyl ether (present in hexanediol diglycidyl ether), cyclohexanedimethanol glycidyl ether, trimethylol-propane diglycidyl ether (present as a mixture in trimethylolpropane triglycidyl ether), glycerol diglycidyl ether (present as a mixture in glycerol triglycidyl ether), pentaerythritol triglycidyl ether (present as a mixture in pentaerythritol tetraglycidyl ether). Preference is given to using trimethylolpropane diglycidyl ether, which occurs in a relatively high fraction in customarily prepared trimethylolpropane triglycidyl ether.

Use may also be made, however, of other, similar hydroxyl-containing epoxides, more particularly glycidol, 3-glycidyloxybenzyl alcohol or hydroxymethylcyclohexene oxide. Additionally preferred is the β-hydroxy ether of the formula (IIIb), which is present at about 15% in commercial liquid epoxy resins prepared from bisphenol A (R=CH₃) and epichlorohydrin, and also the corresponding β-hydroxy ethers of the formula (IIIb) that are formed in the reaction of bisphenol F (R=H) or of the mixture of bisphenol A and bisphenol F with epichlorohydrin.

hexamethylene diisocyanate (HDI), toluene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate (H₁₂MDI), p-phenylene diisocyanate (PPDI), m-tetramethylxylylene diisocyanate (TMXDI), etc. and also their dimers. Preference is given to HDI, IPDI, MDI or TDI.

Suitable triisocyanates are for example trimers or biurets of aliphatic, cycloaliphatic, aromatic or araliphatic diisocya-

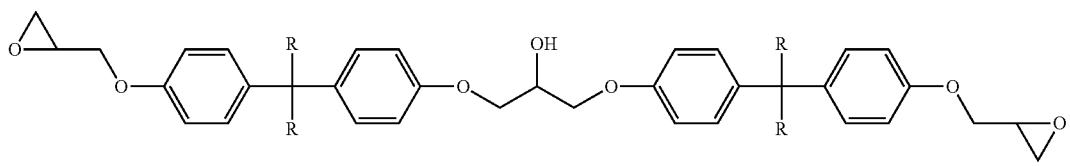

(IIIb)

Additionally preferred are also distillation residues which are obtained during the preparation of high-purity distilled liquid epoxy resins. These distillation residues have an up to three times higher concentration of hydroxyl-containing epoxides than do commercial undistilled liquid epoxy resins. Moreover, a wide variety of epoxides with a p-hydroxy ether group, prepared by reacting (poly)epoxides with a deficit amount of monofunctional nucleophiles such as carboxylic acids, phenols, thiols or secondary amines, can also be used.

The radical R⁴ is with more particular preference a trivalent radical of the formula nates, more particularly the isocyanurates and biurets of the diisocyanates described in the preceding paragraph.

Suitable mixtures of di- or triisocyanates can of course also be used. Most particular suitability as polymers $Q_{PM}$ having terminal amino, thiol or hydroxyl groups is possessed by polymers $Q_{PM}$ having two or three terminal amino, thiol or hydroxyl groups.

The polymers $Q_{PM}$ advantageously have an equivalent weight of 300-6,000, more particularly of 600-4,000, preferably of 700-2,200 g/equivalent of NCO-reactive groups.

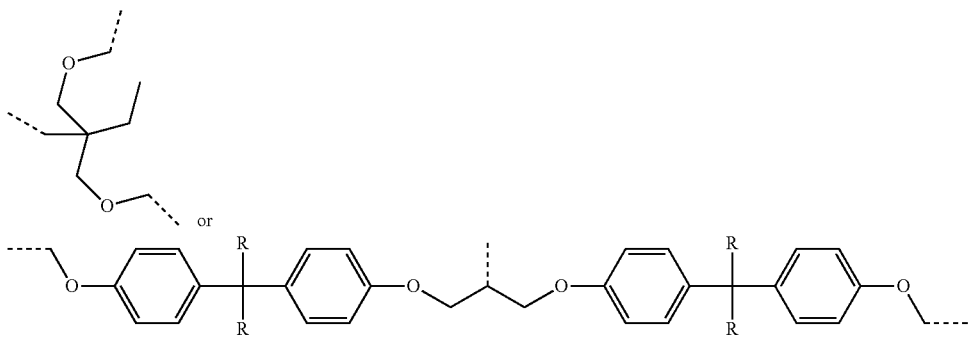

where R is methyl or H.

The free primary or secondary OH functionality of the monohydroxyl epoxide compound of the formula (IIIa) allows efficient reaction with terminal isocyanate groups of polymers, without the need to use disproportionate excesses of the epoxide component.

The polyurethane polymer PU1 on which Y' is based can be prepared from at least one diisocyanate or triisocyanate and also from at least one polymer $Q_{PM}$ having terminal amino, thiol or hydroxyl groups and/or from an optionally substituted polyphenol $Q_{PP}$.

Throughout the present specification the prefix "poly" in "polyisocyanate", "polyol", "polyphenol", and "polymercaptan" designates molecules which formally contain two or more of the respective functional groups.

Suitable diisocyanates are for example aliphatic, cycloaliphatic, aromatic or araliphatic diisocyanates, more particularly commercially customary products such as methylenediphenyl diisocyanate (MDI), 1,4-butane diisocyanate, Suitability as polymers $Q_{PM}$ is possessed by polyols, examples being the following commercially customary polyols or any desired mixtures thereof:

polyoxyalkylene polyols, also called polyether polyols, which are the polymerization product of ethylene oxide, 1,2-propylene oxide, oxetane, 1,2- or 2,3-butylene oxide, tetrahydrofuran or mixtures thereof, optionally polymerized by means of a starter molecule having two or three active H atoms such as water, for example, or compounds having two or three OH groups. Use may be made both of polyoxyalkylene polyols which have a low degree of unsaturation (measured by ASTM D-2849-69 and reported in milliequivalents of unsaturation per gram of polyol (meq/g)), prepared for example with the aid of what are called double metal cyanide complex catalysts (DMC catalysts for short), and of polyoxyalkylene polyols having a higher degree of unsaturation, prepared for example by means of anionic catalysts such as NaOH, KOH or alkali metal alkoxides. Of especial suitability are polyoxypropylene diols and triols having a degree of unsaturation of less than 0.02 meq/g and having a molecular weight in the range of 1,000-30,000 daltons, polyoxybutylene diols and triols, polyoxypropylene diols and triols having a molecular weight of 400-8,000 daltons, and also "EO-endcapped" (ethylene oxide-endcapped) polyoxypropylene diols or triols. The latter are specific polyoxypropylene-polyoxyethylene polyols which are obtained, for example, by alkoxylating pure polyoxypropylene polyols with ethylene oxide when the polypropoxylation is finished, and which as a result contain primary hydroxyl groups.

hydroxy-terminated polybutadiene polyols, such as those, for example, prepared by polymerization of 1,3-butadiene and allyl alcohol or by oxidation of polybutadiene, and also their hydrogenation products;

styrene-acrylonitrile grafted polyether polyols, of the kind supplied, for example, by Elastogran under the name Lupranol®;

polyhydroxy-terminated acrylonitrile/butadiene copolymers, of the kind preparable, for example, from carboxyl-terminated acrylonitrile/butadiene copolymers (available commercially under the name Hycar® CTBN from Nanoresins AG, Germany) and epoxides or amino alcohols;

polyester polyols, prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, and also polyester polyols from lactones such as ε-caprolactone, for example;

polycarbonate polyols, of the kind obtainable through reaction, for example, of the abovementioned alcohols—those used for synthesizing the polyester polyols—with dialkyl carbonates, diaryl carbonates or phosgene.

Advantageous polymers $Q_{PM}$ are those of polyols with a functionality of two or more which have OH equivalent weights of 300 to 6,000 g/OH equivalent, more particularly of 600 to 4,000 g/OH equivalent, preferably 700-2,200 g/OH equivalent. Also advantageously the polyols are selected from the group consisting of polyethylene glycols, polypropylene glycols, polyethylene glycol-polypropylene glycol block copolymers, polybutylene glycols, hydroxyl-terminated polybutadienes, hydroxyl-terminated butadieneacrylonitrile copolymers, hydroxyl-terminated synthetic rubbers, their hydrogenation products, and mixtures of these stated polyols.

It is also possible, furthermore, as polymers $Q_{PM}$, to use difunctional or higher-functional amino-terminated polyethylene ethers, polypropylene ethers of the kind sold, for example, under the name Jeffamine® by Huntsman, polybutylene ethers, polybutadienes, butadiene/acrylonitrile copolymers, of the kind sold, for example, under the name Hycar® ATBN from Nanoresins AG, Germany, and also further amino-terminated synthetic rubbers or mixtures of the stated components.

For certain applications, suitable polymers $Q_{PM}$ include more particularly hydroxyl-containing polybutadienes or polyisoprenes or their partially or fully hydrogenated reaction products.

It is additionally possible for the polymers $Q_{PM}$ also to have been chain-extended in a way which can be carried out, in a manner known to the person skilled in the art, through the reaction of polyamines, polyols, and polyisocyanates, more particularly of diamines, diols, and diisocyanates.

Taking the example of a diisocyanate and a diol, and depending on the chosen stoichiometry, the product of said reaction, as shown below, is a species of the formula (A) or (B)

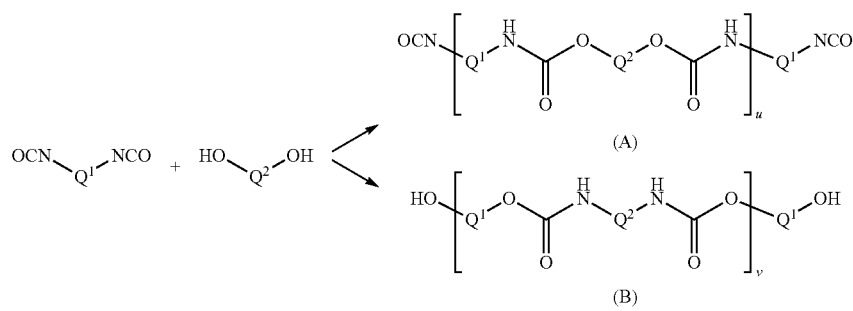

The radicals $Q^1$ and $Q^2$ are a divalent organic radical and the indices u and v vary, depending on stoichiometric ratio, from 1 to typically 5.

These species of the formula (A) or (B) can then in turn be reacted further. Thus, for example, from the species of the formula (A) and a diol having a divalent organic radical $Q^3$ it is possible to form a chain-extended polyurethane polymer PU1 of the following formula:

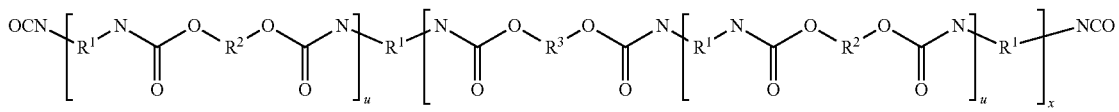

From the species of the formula (B) and a diisocyanate having a divalent organic radical $Q^4$ it is possible to form a chain-extended polyurethane polymer PU1 of the following formula:

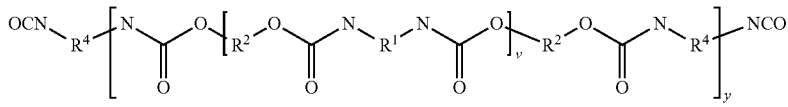

The indices x and y vary, depending on stoichiometric ratio, from 1 to typically 5, and more particularly are 1 or 2.

Furthermore, the species of the formula (A) can also be reacted with the species of the formula (B), giving a chain-extended polyurethane polymer PU1 containing NCO groups.

For the chain extension more particular preference is given to diols and/or diamines and diisocyanates. It is of course clear to the person skilled in the art that polyols of higher functionality, such as trimethylolpropane or pentaerythritol, or polyisocyanates of higher functionality, such as isocyanurates of diisocyanates, can also be used for the chain extension.

In the case of the polyurethane polymers PU1 generally, and in the case of the chain-extended polyurethane polymers specifically, it should advantageously be ensured that the polymers do not have excessively high viscosities, particularly if compounds of relatively high functionality are used for the chain extension, since high viscosities may hamper their reaction to form the polymers of the formula (II) and/or may hamper the application of the composition.

Preferred polymers $Q_{PM}$ are polyols having molecular weights between 600 and 6,000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers, and mixtures thereof. Particularly preferred polymers $Q_{PM}$ are α,ω-dihydroxypolyalkylene glycols having $C_2$-$C_6$ alkylene groups or having mixed $C_2$-$C_6$ alkylene groups and terminated with amino groups, thiol groups or, preferably, hydroxyl groups. Particularly preferred are polypropylene glycols or polybutylene glycols. Additionally particularly preferred are hydroxyl-group-terminated polyoxybutylenes.

Particularly suitable as polyphenol $Q_{PP}$ are bis-, tris-, and tetraphenols. By these are meant not only pure phenols but also, where appropriate, substituted phenols. The nature of the substitution may be very diverse. The reference here is more particularly to substitution directly on the aromatic nucleus to which the phenolic OH group is attached. By phenols are meant, furthermore, not only mononuclear aromatics, but also polynuclear or fused aromatics or heteroaromatics which contain the phenolic OH group directly on the aromatic or heteroaromatic moiety, respectively.

The nature and position of such a substituent exerts an influence on—among other things—the reaction with isocyanates that is necessary for the formation of the polyurethane polymer PU1.

Particularly suitable are the bis- and trisphenols. Examples of suitable bisphenols or trisphenols include 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl) sulfone (=bisphenol S), naphthoresorcinol, dihydroxynaphthalene, dihydroxyanthraquinone, dihydroxybiphenyl, 3,3-bis(p-hydroxyphenyl)phthalides, 5,5-bis(4-hydroxyphenyl)hexahydro-4,7-methanoindane, phenolphthalein, fluorescein, 4,4'-[bis(hydroxyphenyl)-1,3-phenylenebis(1-methylethylidene)](=bisphenol M), 4,4'-[bis(hydroxyphenyl)-1,4-phenylenebis(1-methylethylidene)] (=bisphenol P), 2,2'-diallylbisphenol A, diphenols and dicresols prepared by reacting phenols or cresols with diisopropylidenebenzene, phloroglucinol, gallic esters, phenol novolaks or cresol novolaks with OH functionality of 2.0 to 3.5, and also all isomers of the aforementioned compounds.

Preferred diphenols and dicresols prepared by reacting phenols or cresols with diisopropylidenebenzene have a chemical structural formula of the kind shown below, correspondingly, for cresol as an example:

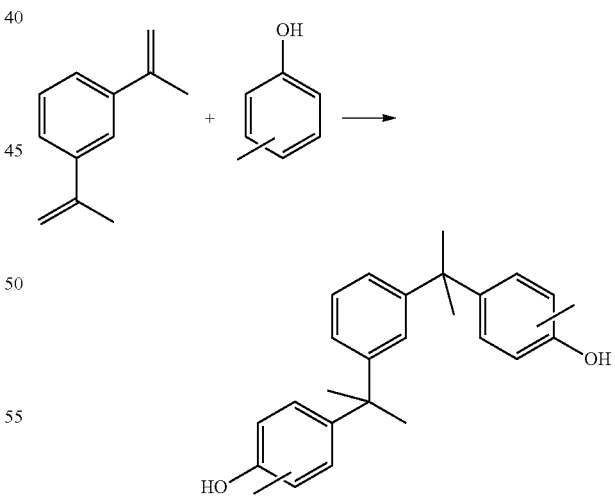

Particular preference is given to bisphenols of low volatility. The most preferred are bisphenol M, bisphenol S, and 2,2'-diallylbisphenol A.

Preferably the $Q_{PP}$ contains 2 or 3 phenolic groups.

In a first embodiment the polyurethane polymer PU1 is prepared from at least one diisocyanate or triisocyanate and also from a polymer $Q_{PM}$ having terminal amino, thiol or hydroxyl groups. The polyurethane polymer PU1 is prepared in a manner known to the person skilled in the polyurethane art, more particularly by using the diisocyanate or triisocyanate in a stoichiometric excess in relation to the amino, thiol or hydroxyl groups of the polymer $Q_{PM}$.

In a second embodiment the polyurethane polymer PU1 is prepared from at least one diisocyanate or triisocyanate and also from an optionally substituted polyphenol $Q_{PP}$. The polyurethane polymer PU1 is prepared in a manner known to the person skilled in the polyurethane art, more particularly by using the diisocyanate or triisocyanate in a stoichiometric excess in relation to the phenolic groups of the polyphenol $Q_{PP}$.

In a third embodiment the polyurethane polymer PU1 is prepared from at least one diisocyanate or triisocyanate and also from a polymer $Q_{PM}$ having terminal amino, thiol or hydroxyl groups and also from an optionally substituted polyphenol $Q_{PP}$. For the preparation of the polyurethane polymer PU1 from at least one diisocyanate or triisocyanate and also from a polymer $Q_{PM}$ having terminal amino, thiol or hydroxyl groups and/or from an optionally substituted polyphenol $Q_{PP}$ there are various possibilities available.

In a first process, called "one-pot process", a mixture of at least one polyphenol $Q_{PP}$ and at least one polymer $Q_{PM}$ is reacted with at least one diisocyanate or triisocyanate in an isocyanate excess.

In a second process, called "2-step process I", at least one polyphenol $Q_{PP}$ is reacted with at least one diisocyanate or triisocyanate in an isocyanate excess and then with at least one polymer $Q_{PM}$ in a substoichiometric amount.

In the third process finally, called "2-step process II", at least one polymer $Q_{PM}$ is reacted with at least one diisocyanate or triisocyanate in an isocyanate excess and then with at least one polyphenol $Q_{PP}$ in a substoichiometric amount.

The three processes lead to isocyanate-terminated polyurethane polymers PU1 which, while having the same composition, may differ in the sequence of their constituent units. All three processes are suitable, but the "two-step process II" is preferred.

Where the above-described isocyanate-terminal polyurethane polymers PU1 are synthesized from difunctional components, it has been found that the polymer $Q_{PM}$/polyphenol $Q_{PP}$ equivalent ratio is preferably greater than 1.50 and the polyisocyanate/(polyphenol $Q_{PP}$+polymer $Q_{PM}$) equivalent ratio is preferably greater than 1.20.

Where the average functionality of the components used is greater than 2, the increase in molecular weight is more rapid than in the purely difunctional case. For the person skilled in the art it is clear that the limits on the possible equivalent ratios depend greatly on whether the chosen polymer $Q_{PM}$, the polyphenol $Q_{PP}$, the polyisocyanate, or two or more of the stated components possess a functionality >2. Accordingly it is possible to set different equivalent ratios, whose limits are determined by the viscosity of the resulting polymers and which must be determined experimentally from one case to the next.

The polyurethane polymer PU1 is preferably elastic in character and displays a glass transition temperature Tg of less than 0° C.

The terminally blocked polyurethane polymer of the formula (II) is advantageously elastic in character and, furthermore, is advantageously soluble or dispersible in liquid epoxy resins.

In the formula (II) m is preferably other than 0.

Particularly preferred are at the same time two or more toughness improvers D as a constituent of the heat-curing epoxy resin composition. With particular preference the heat-curing epoxy resin composition comprises at least one blocked polyurethane polymer of the formula (II) and also at least one core-shell polymer and/or one carboxyl- or (meth) acrylate- or epoxide-group-terminated acrylonitrile/butadiene copolymer, or a derivative thereof.

The fraction of the toughness improver D is advantageously 0.1%-50%, more particularly 0.5%-30%, by weight, of the weight of the composition.

In one further preferred embodiment, the composition further comprises at least one filler F. Fillers in question here are preferably carbon black, mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminum hydroxide, magnesium oxide, hollow ceramic beads, hollow glass beads, hollow organic beads, glass beads, and color pigments. Reference to filler F is not only to the organically coated forms but also to the uncoated commercially available forms and the forms known to the person skilled in the art.

The total fraction of the overall filler F is advantageously 2%-50%, preferably 3%-35%, by weight, more particularly 5%-25% by weight based on the weight of the overall composition.

In another preferred embodiment the composition comprises a chemical blowing agent H, of the kind obtainable, for example, under the tradename Expancel™ from Akzo Nobel or Celogen™ from Chemtura or Luvopor™ from Lehmann & Voss, Germany. The fraction of the blowing agent H is advantageously 0.1%-3% by weight, based on the weight of the composition.

In one further preferred embodiment, the composition further comprises at least one reactive diluent G which carries epoxide groups. These reactive diluents G are more particularly:

glycidyl ethers of monofunctional saturated or unsaturated, branched or unbranched, cyclic or open-chain $C_4$-$C_{30}$ alcohols, e.g., butanol glycidyl ether, hexanol glycidyl ether, 2-ethylhexanol ether, allyl glycidyl ether, tetrahydrofurfuryl and furfuryl glycidyl ethers, trimethoxysilyl glycidyl ether, etc.

glycidyl ethers of difunctional saturated or unsaturated, branched or unbranched, cyclic or open-chain $C_2$-$C_{30}$ alcohols, e.g., ethylene glycol, butanediol, hexanediol, and octanediol glycidyl ethers, cyclohexanedimethanol diglycidyl ether, neopentyl glycol diglycidyl ether, etc.

glycidyl ethers of trifunctional or polyfunctional, saturated or unsaturated, branched or unbranched, cyclic or open-chain alcohols such as epoxidized castor oil, epoxidized trimethylolpropane, epoxidized pentaerythritol or polyglycidyl ethers of aliphatic polyols such as sorbitol, glycerol, trimethylolpropane, etc.

glycidyl ethers of phenol compounds and aniline compounds, such as phenyl glycidyl ether, cresol glycidyl ether, p-tert-butylphenyl glycidyl ether, nonylphenol glycidyl ether, 3-n-pentadecenyl glycidyl ether (from cashew nut shell oil), N,N-diglycidylaniline, etc.

epoxidized amines such as N,N-diglycidylcyclohexylamine, etc.

epoxidized monocarboxylic or dicarboxylic acids such as glycidyl neodecanoate, glycidyl methacrylate, glycidyl benzoate, diglycidyl phthalate, tetrahydrophthalate, and hexahydrophthalate, diglycidyl esters of dimeric fatty acids, etc.

epoxidized difunctional or trifunctional polyether polyols of low to high molecular mass, such as polyethylene glycol diglycidyl ether, polypropylene glycol diglycidyl ether, etc.

Particular preference is given to hexanediol diglycidyl ether, cresyl glycidyl-ether, p-tert-butylphenyl glycidyl ether, polypropylene glycol diglycidyl ether, and polyethylene glycol diglycidyl ether.

The total fraction of the reactive diluent G carrying epoxide groups is advantageously 0.1%-20%, preferably 0.5%-8%, by weight, based on the weight of the overall composition.

The composition may comprise further ingredients, more particularly catalysts, heat stabilizers and/or light stabilizers, thixotropic agents, plasticizers, solvents, organic or mineral fillers, blowing agents, and dyes and pigments.

It has been found advantageous that the heat-curing epoxy resin composition is free from organic carboxylic acids.

It has emerged that the heat-curing epoxy resin compositions of the invention are especially suitable for use as one-component adhesives. The invention, in a further aspect, accordingly provides for the use of the above-described heat-curing epoxy resin composition as a one-component heat-curing adhesive, more particularly as a one-component heat-curing body shell adhesive in vehicle construction. A one-component adhesive of this kind has broad possibilities for use. In particular, it is possible therewith to realize heat-curing one-component adhesives which are distinguished by a high impact toughness. Such adhesives are required for the bonding of heat-stable materials. By heat-stable materials are meant materials which are dimensionally stable, at least during the cure time, at a curing temperature of 100-220° C., preferably 120-200° C. These materials are more particularly metals and plastics such as ABS, polyamide, polyphenylene ether, composite materials such as SMC, unsaturated polyester GRP, composite epoxide materials or composite acrylate materials. Preference is given to the application wherein at least one material is a metal. A particularly preferred use is the adhesive bonding of like or different materials, more particularly in bodyshell construction in the automobile industry. The preferred metals are principally steel, more particularly electrolytically galvanized, hot-dip galvanized, and oiled steel, Bonazinc-coated steel, and retrospectively phosphated steel, and also aluminum, more particularly in the versions typically found in automaking.

With an adhesive based on a heat-curing composition of the invention it is possible to achieve the desired combination of high impact toughness with good storage stability and with low curing temperatures. In addition to these qualities the composition has high mechanical values. It has been found more particularly that glass transition temperatures of above 85° C., in particular of 100° C. or more, can be achieved, this being especially important for applications involving high working temperatures.

In another aspect, therefore, the invention provides a method of adhesively bonding heat-stable materials, which involves contacting these materials with an above-described epoxy resin composition, and which comprises one or more steps of curing at a temperature of 100-220° C., preferably 120-200° C. More particularly an adhesive of this kind is first contacted with the materials to be bonded, at a temperature of between 10° C. and 80° C., more particularly between 10° C. and 60° C., and is later cured at a temperature of typically 100-220° C., preferably 120-200° C.

It has been found in particular that the heat-curing epoxy resin compositions can be cured even under what are called underbake conditions, i.e., the composition achieves good mechanical curing properties even at temperatures of below 170° C. It has become apparent, for example, that with compositions of this kind it is possible, by heating for 10 minutes at just 165° C., more particularly 160° C., to obtain tensile shear strength values (for details of the measurement, reference may be made here to the examples) of more than 15 MPa, more particularly of more than 19 MPa, and that these values differ only slightly from 30-minute 180° C.-cured values.

Following adhesive bonding, the bonded materials may be used at temperatures between 120° C. and −40° C., preferably between 110° C. and −40° C., more particularly between 100° C. and −40° C.

A method of this kind for the bonding of heat-stable materials produces an adhesively bonded article, and this constitutes a further aspect of the present invention. An article of this kind is preferably a vehicle or a part for installation in or on a vehicle.

Of course, with a composition of the invention, it is possible, as well as heat-curing adhesives, to realize sealants or coatings. Furthermore, the compositions of the invention are suitable not only for automaking but also for other fields of application. Particularly noteworthy are related applications in the construction of means of transport such as boats, trucks, buses or rail vehicles, or in the construction of consumer goods such as washing machines, for example.

The heat-curing epoxy resin compositions described display preferably excellent mechanical properties, more particularly high tensile strengths and high impact toughness, and also have excellent storage stability, even at a relatively long time at relatively high temperatures, and nevertheless exhibit outstanding cure at temperatures of 170° C. to 150° C., more particularly between 170° C. and 160° C.

It is possible, moreover, to obtain adhesives which possess a high glass transition temperature, typically or more than 95° C.

Compositions can be formulated which typically have fracture energies, measured in accordance with ISO 11343, of more than 40 J, in some cases more than 43 J, at 23° C.

One particularly preferred application of the heat-curing epoxy resin composition of the invention is its application as a heat-curing body shell adhesive in vehicle construction.

It has emerged, moreover, that the heat-curing epoxy resin compositions described can be used for producing a structural foam for the reinforcement of cavities, especially of metallic structures. In these cases the composition contains a chemical blowing agent H.

On heating, the chemical blowing agent first evolves a gas, and so, together with the composition, a foam is formed, and, secondly, the epoxy resin composition cures.

The at least partial filling of a cavity with a heat-curing composition of this kind, and heating of the bonded materials to a temperature of 100-220° C., preferably 120-200° C., produces a foamed article.

More particularly this produces a vehicle or vehicle component which comprises an article foamed in this way.

Entirely surprisingly it has further emerged that the use of an accelerant of the formula (Ia) or (Ib), as described above, leads to an increase in the impact toughness of heat-curing epoxy resin compositions. This is particularly also the case in heat-curing epoxy resin compositions which already possess a very high level of impact toughness. Thus, for example, it has been possible, in heat-curing epoxy resin compositions which already have an impact peel strength of approximately 14 J, measured in accordance with ISO 11343 at 25° C., to achieve increases of more than 15%, and in certain cases even more than 23%.

The reason this is particularly surprising is that aliphatic accelerants possessing very similar structures, and occasionally even with the same empirical formula, do not exhibit this effect. Aromatic accelerants not conforming to the formula (Ia) or (Ib), such as, for example, 3,3'-(4-methyl-1,3-phenylene)bis(1,1-dimethylurea), do not display this effect to the same extent as the accelerants of the formula (Ia) or (Ib), and, moreover, result in a deterioration in storage stability.

EXAMPLES

Curing Agents for Epoxy Resins

N,N-Dimethylurea (=1,1-dimethylurea)("asym DMH")

n=1, $R^1$=H, $R^2$=$R^3$=$CH_3$

N,N-Dimethylurea was obtained from Aldrich, Switzerland.

N',N'-Dimethyl-N-butylurea (=3-butyl-1,1-dimethylurea) ("BuDMH")

n=1, $R^1$=n-butyl, $R^2$=$R^3$=$CH_3$ 50 ml of tetrahydrofuran (THF) and 20.0 g of an approximately 33% strength solution of dimethylamine in ethanol (Fluka) (about 146 mmol of amine) were charged to a 100 ml two-neck flask with reflux condenser. Subsequently, over 30 minutes, 14.5 g of butyl isocyanate (Fluka) (about 146 mmol of NCO) were slowly added dropwise, producing a slight exothermic response. After 3 hours of stirring at ambient temperature, the solvent was stripped off on a rotary evaporator at 80° C. under vacuum. This gave about 21.0 g of a slightly yellowish, low-viscosity liquid. The desired adduct was used further without other purification.

Hexamethylenebis(1,1-dimethylurea) (=1,1'-(hexane-1,6-diyl)bis(3,3-dimethylurea) ("HDI-DMH")

n=2, $R^1$=—$(CH_2)_6$—, $R^2$=$R^3$=$CH_3$ 50 ml of THF and 20.0 g of an approximately 33% strength solution of dimethylamine in ethanol (Fluka) (about 146 mmol of amine) were charged to a 100 ml two-neck flask with reflux condenser. Subsequently, over 30 minutes, 10.0 g of hexamethylene diisocyanate (Fluka) (about 119 mmol of NCO) were added slowly dropwise, producing a slight exothermic response and immediately precipitating a white solid. After 2 hours of stirring at ambient temperature, the suspension was filtered. The filter product was washed 3× with 20 ml of THF each time. The crude product obtained was dried under vacuum at 80° C. for 3 h. The desired product was obtained in the form of 12.3 g of a white powder.

Adduct of Desmodur N-100 with dimethylurea ("N100DMH")

n=3, $R^1$=formula (IX), $R^2$=$R^3$=$CH_3$

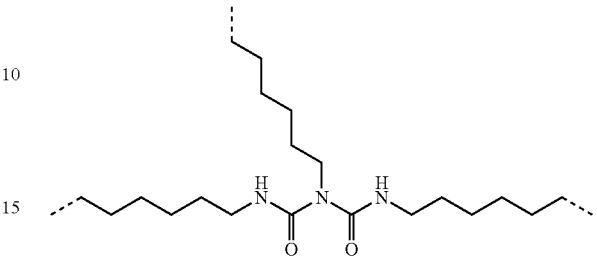

(IX)

30 ml of THF and 20.0 g of an approximately 33% strength solution of dimethylamine in ethanol (Fluka) (about 146 mmol of amine) were charged to a 100 ml two-neck flask with reflux condenser. Subsequently, over 30 minutes, 18.7 g of the hexamethylene diisocyanate trimer Desmodur N-100 (Bayer) (about 118 mmol of NCO) in 20 ml of THF were slowly added dropwise, producing a slight exothermic response. After 2 hours of stirring at ambient temperature, the solvent and also the excess dimethylamine were evaporated first at 100° C. under a stream of nitrogen and collected in a gas wash bottle with acidic water, followed by further drying on a rotary evaporator at 80° C. under vacuum. Decanting from the flask gave about 21.5 g of a virtually colorless, high-viscosity product. The desired adduct was used further without other purification.

Benzyldimethylurea ("BzDMH")

n=1, $R^1$=—$(CH_2)$—$C_6H_5$, $R^2$=$R^3$=$CH_3$ 15.0 g (139.5 mmol) of N,N-dimethylcarbamoyl chloride and 80 ml of dioxane were charged to a 250 ml two-neck flask with reflux condenser. Subsequently 13.66 g (135 mmol) of triethylamine and 14.89 g (139 mmol) of benzylamine were added. After the exothermic response had subsided, the mixture was stirred at 90° C. for 5 h, during which there was rapid formation of a slightly orange suspension. The resulting suspension was filtered while hot. The turbidity which developed as the solution cooled was removed by further filtration. The solvent was stripped off on a rotary evaporator at 60° C. This gave above 14.0 g of a slightly orange, waxlike solid.

3,3'-(4-Methyl-1,3-phenylene)bis(1,1-dimethylurea) ("TDIDMH")

n=2, $R^1$=formula (X), $R^2$=$R^3$=$CH_3$

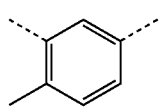

(X)

3,3'-(4-Methyl-1,3-phenylene)bis(1,1-dimethylurea) was obtained from Fluka, Switzerland.

N,N'-Dimethylurea (=1,3-dimethylurea) ("sym DMH")

n=1, $R^1$=$CH_3$, $R^2$=H, $R^3$=$CH_3$
N,N'-Dimethylurea was obtained from Fluka, Switzerland.

N,N,N',N'-Tetramethylurea
(=1,1,3,3-tetramethylurea) ("TMH")

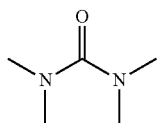

N,N,N',N'-Tetramethylurea was obtained from Fluka, Switzerland.

TABLE 1

Raw materials used.

| | |
|---|---|
| D.E.R. 330 (Bisphenol A diglycidyl ether = "DGEBA") | Dow |
| Polypox R7 (tert-butylphenyl glycidyl ether) = "Polypox") | UPPC |
| Polydis 3614, epoxy-resin-modified CTBN (= "Polydis'") | Struktol |
| Dicyandiamide (= "Dicy") | Degussa |
| PolyTHF 2000 (difunctional polybutylene glycol (OH equivalent weight = about 1000 g/OH equivalent) | BASF |
| Liquiflex H (hydroxyl-terminated polybutadiene) (OH equivalent weight = about 1230 g/OH equivalent) | Krahn |
| Isophorone dicyanate (= "IPDI") | Evonik |
| Cardolite NC-700 (Cardanol, meta-substituted alkenyl-mono-phenol) | Cardolite |

Preparation of a Toughness Improver ("D-1")

150 g of poly-THF 2000 (OH number 57 mg/g KOH) and 150 of Liquiflex H (OH number 46 mg/g KOH) were dried at 105° C. under vacuum for 30 minutes. When the temperature had been reduced to 90° C., 61.5 g of IPDI and 0.14 g of dibutyltin dilaurate were added. The reaction was continued at 90° C. under vacuum until the NCO content was constant at 3.10% after 2.0 h (calculated NCO content: 3.15%). Then 96.1 g of Cardanol were added as a blocking agent. Stirring was continued at 105° C. under vacuum until the NCO content had dropped, after 3.5 h, below 0.1%. The product in this form was used as toughness improver D-1.

Preparation of the Compositions

In accordance with the details in table 2, the reference compositions Ref.1-Ref. 4 and also the inventive compositions 1, 2, 3, 4 and 5 were prepared. In the reference examples there were in each case no accelerant (Ref.1) or accelerants not conforming to the formula (Ia) used, whereas this was the case for examples 1, 2, 3, 4 and 5. The amount of accelerants used was calculated such that the overall concentration of urea groups was constant.

Test Methods:

Tensile Shear Strength (TSS) (DIN EN 1465)

The specimens were produced from the above-described compositions and with electrolytically galvanized DC04 steel (eloZn) with dimensions of 100×25 5×0.8 mm, the bond area being 25×10 mm with a layer thickness of 0.3 mm. Curing took place for 30 minutes at 180° C. ("$TSS_{180}$"), or for 10 min at 165° C. ("$TSS_{165}$"), in a forced-air oven. Measurement took place after cooling to room temperature, after one day, with a pulling speed of 10 mm/min.

Impact Peel Energy (ISO 11343)

The specimens were produced from the above-described compositions and with electrolytically galvanized DC04 steel (eloZn) with dimensions of 90×20×0.8 mm, the bond area being 20×30 mm with a layer thickness of 0.3 mm. Curing took place for 30 minutes at 180° C. The impact peel energy was measured in each case at 23° C. The peeling speed was 2 m/s. The fracture energy ("FE") reported, in joules, is the area under the measurement curve (from 25% to 90%, in accordance with ISO 11343).

As the increase in impact toughness relative to reference example Ref.1, the "$\Delta_{FE}$" value in the table was determined in accordance with the following formula:

$$\Delta_{FE}=[FE/FE(Ref.1)]-1.$$

Viscosity

The adhesive samples were measured on a Bohlin CVO 120 plate/plate viscometer (diameter 25 mm, gap dimension 1 mm), frequency 5 Hz, 0.01 deflection, temperature 23-53° C., 10° C./min. The viscosity in this case was determined as the complex viscosity at 25° C. from the measurement plot.

Following their preparation, the adhesives were stored at 25° C. for 1 day or at 60° C. for one week. After they had cooled to room temperature, the viscosity was measured, and was reported as "Visc (Id, 25° C.)", or as "Visc (1 w, 60° C.)" in table 2. Viscosity increase ($\Delta_{visc}$) was calculated in accordance with the formula $$[Visc (1w, 60° C.)/visc (1d, 25° C.)]-1.$$

The results of these tests are summarized in table 2.

TABLE 2

Compositions and results.

| | Ref. 1 | Ref. 2 | Ref. 3 | Ref. 4 | 1 | 2 | 3 | 4 | 5 |
|---|---|---|---|---|---|---|---|---|---|
| DGEBA [pbw[1]] | 40.0 | 40.0 | 40.0 | 40.0 | 40.0 | 40.0 | 40.0 | 40.0 | 40.0 |
| Polypox [pbw[1]] | 3.0 | 3.0 | 3.0 | 3.0 | 3.0 | 3.0 | 3.0 | 3.0 | 3.0 |
| Polydis [pbw[1]] | 15.0 | 15.0 | 15.0 | 15.0 | 15.0 | 15.0 | 15.0 | 15.0 | 15.0 |
| D-1 [pbw[1]] | 15.0 | 15.0 | 15.0 | 15.0 | 15.0 | 15.0 | 15.0 | 15.0 | 15.0 |
| Dicy [pbw[1]] | 4.01 | 4.01 | 4.01 | 4.01 | 4.01 | 4.01 | 4.01 | 4.01 | 4.01 |
| TDIDMH [pbw[1]] | | 0.51 | | | | | | | |
| TMH [pbw[1]] | | | 0.45 | | | | | | |
| sym-DMH [pbw[1]] | | | | 0.34 | | | | | |
| asym-DMH [pbw[1]] | | | | | 0.34 | | | | |
| BuDMH [pbw[1]] | | | | | | 0.56 | | | |
| HDIDMH [pbw[1]] | | | | | | | 0.50 | | |
| N100DMH [pbw[1]] | | | | | | | | 0.79 | |
| BzDMH [pbw[1]] | | | | | | | | | 0.69 |
| Filler mixture [pbw[1]] | 19.0 | 19.0 | 19.0 | 19.0 | 19.0 | 19.0 | 19.0 | 19.0 | 19.0 |

TABLE 2-continued

Compositions and results.

| | Ref. 1 | Ref. 2 | Ref. 3 | Ref. 4 | 1 | 2 | 3 | 4 | 5 |
|---|---|---|---|---|---|---|---|---|---|
| TTS$_{180}$ [MPa] | 21.4 | 21.7 | 21.4 | 21.7 | 21.7 | 22.2 | 22.0 | 21.8 | 22.4 |
| TTS$_{165}$ [MPa] | n.m.² | 20.1 | n.m.² | n.m.² | 19.8 | 21.2 | 21.1 | 21.0 | 21.1 |
| FE [J] | 14.2 | 16.1 | 13.9 | 14.4 | 16.5 | 17.5 | 17.4 | 16.3 | 17.3 |
| Δ$_{FE}$[%] | | 13 | −2 | 1 | 16 | 23 | 23 | 15 | 22 |
| Visc (1 d, 25° C.)[mPas] | 395 | 350 | 345 | 360 | 255 | 310 | 360 | 320 | 335 |
| Visc (1 w, 60° C.)[mPas] | 395 | 1340 | 420 | 455 | 305 | 325 | 370 | 335 | 405 |
| Δ$_{visc}$ [%] | | 283 | 22 | 26 | 20 | 5 | 3 | 5 | 21 |

¹pbw = parts by weight
²n.m. = not measurable

The examples Ref.1, Ref.3, and Ref.4 show such inadequate curing at 165° that the specimens fell apart as early as during the removal of the fixing clamps following withdrawal from the oven; accordingly, it was not possible to measure a tensile shear strength. In these cases, the adhesive was still of low viscosity even after cooling to room temperature. Ref. 2, based on a urea with aromatic radicals, does exhibit good cure behavior even at 165° C., but has a very low storage stability.

The inventive examples 1, 2, 3, 4, and 5 exhibit good mechanical values even after curing at 165° C., and also good storage stability.

Furthermore, it is apparent from a comparison of examples Ref.1 with Ref.4 or 1 that it is possible when using accelerants of the formula (Ia) in adhesives which already have a high degree of impact toughness to achieve further sharp improvement in impact toughness, while this is not the case for the corresponding aliphatic accelerants that do not conform to the formula (Ia). In the case of the aromatic accelerants (Ref.2), it was in fact also possible to find this kind of increase in impact toughness, but not to the same extent.

The invention claimed is:
1. A method of adhesively bonding heat-stable materials with improved impact peel strength, comprising:
   contacting a first heat-stable material with a heat-curing epoxy resin composition;
   applying a second heat-stable material to said heat-curing epoxy resin composition on said first heat-stable material; and
   curing the heat-curing epoxy resin composition at a temperature of from 100 to 220° C. to bond the first and second heat-stable materials together;
   wherein the heat-curing epoxy resin composition comprises:
   10% to 85% by weight, based on the overall weight of the composition, of (A) at least one epoxy resin having on average more than one epoxide group per molecule;
   0.1% to 30% by weight, based on the weight of (A), of (B) a dicyandiamide hardener;
   0.02% to 0.85% by weight, based on the weight of (A), of (C) an accelerant;
   0.1% to 50% by weight, based on the overall weight of the composition, of (D) at least one toughener;
   2% to 50% by weight, based on the overall weight of the composition, of (F) at least one filler; and
   0.1%-20% by weight, based on the overall weight of the composition, of (G) at least one reactive diluent which carries one or more epoxy groups per molecule;
   wherein (A) comprises a liquid epoxy resin having the formula (A-II) and optionally a solid epoxy resin of the formula (A-I):

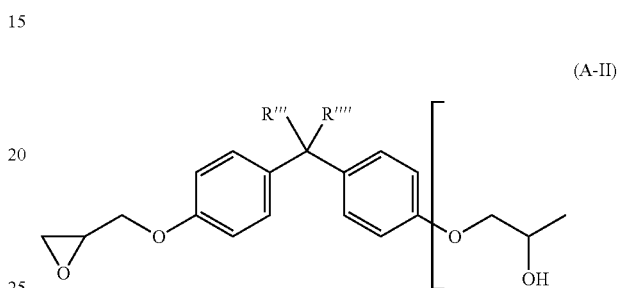
(A-II)

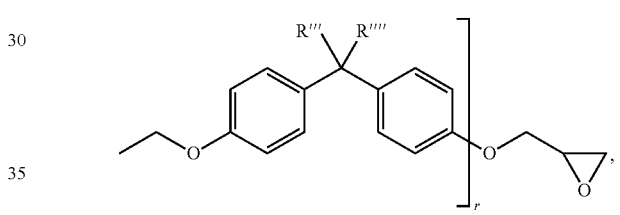

wherein R''' and R'''' independently of one another are either H or CH$_3$, and r is from 0 to 1, and

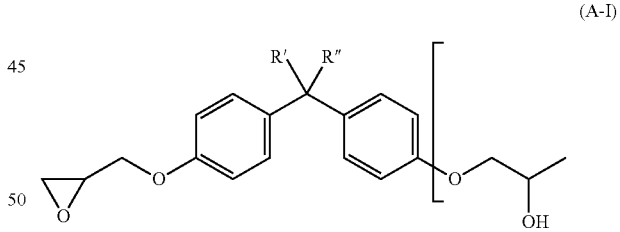
(A-I)

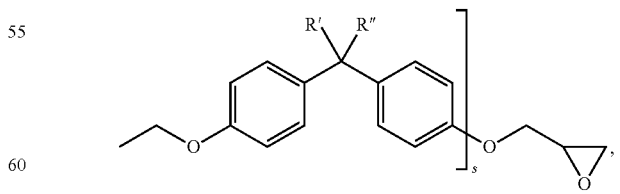

wherein R' and R'' independent of one another are either H or CH$_3$, and s is >1.5;
wherein (C) is selected from compounds of formula (Ia) and compounds of formula (Ib):

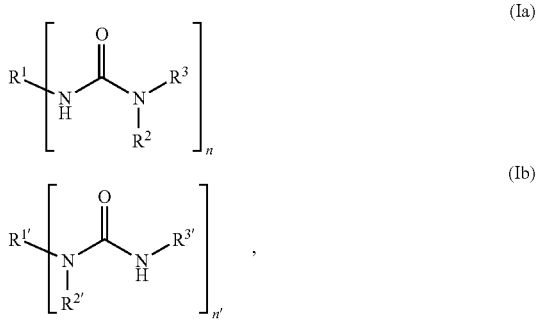

wherein:
R¹ is H or an n'-valent aliphatic, cycloaliphatic or araliphatic radical;
R² and R³ either each independently of one another are an alkyl group or aralkyl group; or
together are a divalent aliphatic radical having 3 to 20 C atoms which is part of an optionally substituted heterocyclic ring having 5 to 8 ring atoms;
R¹' is an n'-valent aliphatic, cycloaliphatic or araliphatic radical;
R²' is an alkyl group or aralkyl group;
R³' independently at each occurrence is H or an alkyl group or aralkyl group; and
n and n' are each from 1 to 4;
  wherein (D) comprises a blocked polyurethane polymer and optionally further comprises one or more of liquid rubbers, epoxy-modified liquid rubbers, and core-shell polymers; and
  wherein the heat-cured epoxy resin composition provides an impact peel strength between the first and second heat-stable materials that is higher than an impact peel strength of a similar heat-cured epoxy resin composition, which is formulated with components (A), (B), (D), (F), and (G), but not with component (C).

2. The method of claim 1, wherein (A) is present in an amount of 15% to 70% by weight, based on the overall weight of the composition.

3. The method of claim 1, wherein (A) is present in an amount of 15% to 60% by weight, based on the overall weight of the composition.

4. The method of claim 1, wherein (B) is present in an amount of 0.2% to 10% by weight based on the weight of (A).

5. The method of claim 1, wherein n is 1 or 2.

6. The method of claim 1, wherein R² and R³ are each a methyl, ethyl or propyl group.

7. The method of claim 1, wherein n is 2 and R¹ is selected from:
an alkylene group having 4 to 10 carbon atoms;

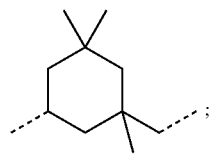

hexamethylene diisocyanate, isophorone diisocyanate, hexamethylene diisocyanate, biuret, or m-xylylene diisocyanate, following removal of the isocyanate groups; and
a xylylene group.

8. The method of claim 1, wherein (C) is 1,1-dimethylurea.

9. The method of claim 1, wherein (D) is present in an amount of 0.5% to 40% by weight, based on the overall weight of the composition.

10. The method of claim 1, wherein (D) further comprises a core-shell polymer.

11. The method of claim 1, wherein (D) further comprises a liquid rubber, which is an acrylonitrile/butadiene copolymer terminated with carboxyl groups or (meth)acrylate groups or epoxide groups, or is a derivative thereof.

12. The method of claim 1, wherein the blocked polyurethane polymer has the formula (II):

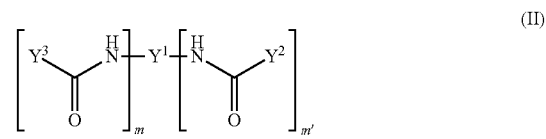

where
Y¹ is a linear or branched polyurethane polymer PU1 terminated with m+m' isocyanate groups, following the removal of all of the terminal isocyanate groups;
Y² independently at each occurrence is a blocking group which is eliminated at a temperature above 100° C.;
Y³ independently at each occurrence is a group of the formula (II')

where R⁴ is a radical of an aliphatic, cycloaliphatic, aromatic or araliphatic epoxide, containing a primary or secondary hydroxyl group following the removal of the hydroxide groups and epoxide groups;
p is 1, 2 or 3; and
m and m' are each between 0 and 8, with the proviso that m+m' is from 2 to 8.

13. The method of claim 12, wherein Y² is a radical which is selected from the group consisting of

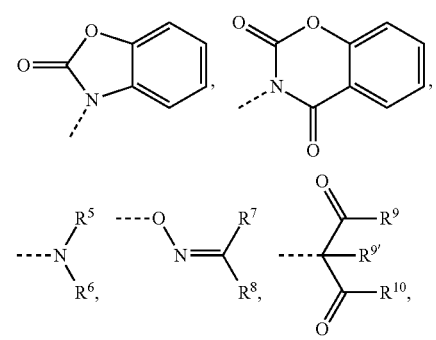

-continued

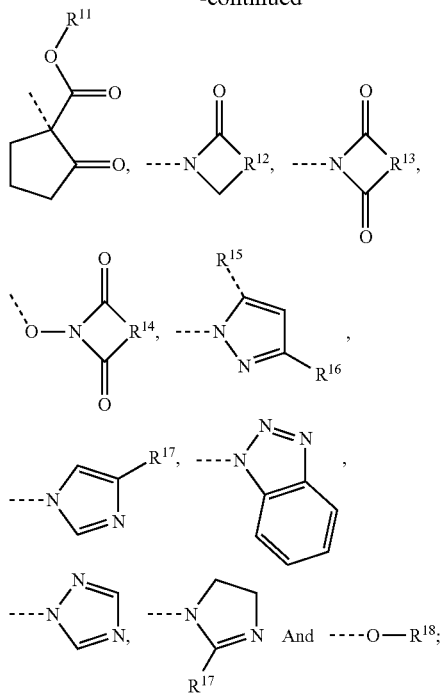

where:
R⁵, R⁶, R⁷, and R⁸ each independently of one another is an alkyl or cycloalkyl or aryl or aralkyl or arylalkyl group; or R⁵ together with R⁶, or R⁷ together with R⁸, form part of a 4- to 7-membered ring which if desired is substituted;
R⁹, R⁹' and R¹⁰ each independently of one another is an alkyl or aralkyl or aryl or arylalkyl group or is an alkyloxy or aryloxy or aralkyloxy group;
R¹¹ is an alkyl group,
R¹², R¹³, and R¹⁴ each independently of one another are an alkylene group having 2 to 5 C atoms, which optionally has double bonds or is substituted, or are a phenylene group or a hydrogenated phenylene group;
R¹⁵, R¹⁶, and R¹⁷ each independently of one another are H or are an alkyl group or are an aryl group or an aralkyl group; and
R¹⁸ is an aralkyl group or is a mono- or polycyclic substituted or unsubstituted aromatic group which optionally contains aromatic hydroxyl groups.

14. The method of claim 12, wherein m is other than 0.

15. The method of claim 1, wherein (G) is selected from the group consisting of:
monofunctional glycidyl ethers of monofunctional saturated or unsaturated, branched or unbranched, cyclic or open-chain C₄-C₃₀ alcohols;
difunctional glycidyl ethers of difunctional saturated or unsaturated, branched or unbranched, cyclic or open-chain C₂-C₃₀ alcohols;
trifunctional or polyfunctional glycidyl ethers of trifunctional or polyfunctional, saturated or unsaturated, branched or unbranched, cyclic or open-chain alcohols;
glycidyl ethers of phenol compounds and aniline compounds;
epoxidized amines;
epoxidized monocarboxylic or dicarboxylic acids; and
epoxidized difunctional or trifunctional polyether polyols.

16. The method of claim 15, wherein:
the monofunctional glycidyl ethers are selected from the group consisting of butanol glycidyl ether, hexanol glycidyl ether, 2-ethylhexanol glycidyl ether, allyl glycidyl ether, tetrahydrofurfuryl glycidyl ethers, furfuryl glycidyl ethers, and trimethoxysilyl glycidyl ether;
the difunctional glycidyl ethers are selected from the group consisting of ethylene glycol diglycidyl ether, butanediol diglycidyl ether, hexanediol diglycidyl ether, octanediol diglycidyl ether, cyclohexanedimethanol diglycidyl ether, and neopentyl glycol diglycidyl ether;
the trifunctional or polyfunctional glycidyl ethers are selected from the group consisting of epoxidized castor oil, epoxidized trimethylolpropane, epoxidized pentaerythritol, and polyglycidyl ethers of aliphatic polyols;
the glycidyl eithers of phenol compounds and aniline compounds are selected from the group consisting of phenyl glycidyl ether, cresol glycidyl ether, p-tert-butylphenyl glycidyl ether, nonylphenol glycidyl ether, 3-n-pentadecenyl glycidyl ether, and N,N-diglycidylaniline;
the epoxidized amines are selected from the group consisting of N,N-diglycidylcyclohexylamine;
the epoxidized monocarboxylic or dicarboxylic acids are selected from the group consisting of: glycidyl neodecanoate, glycidyl methacrylate, glycidyl benzoate, diglycidyl phthalate, diglycidyl tetrahydrophthalate, diglycidyl hexahydrophthalate, and diglycidyl esters of dimeric fatty acids; and
the epoxidized difunctional or trifunctional polyether polyols are selected from the group consisting of polyethylene glycol diglycidyl ether and polypropylene glycol diglycidyl ether.

17. The method of claim 16, wherein (G) is selected from the group consisting of hexanediol diglycidyl ether, cresol glycidyl ether, p-tert-butylphenyl glycidyl ether, polypropylene glycol diglycidyl ether, and polyethylene glycol diglycidyl ether.

18. The method of claim 1, wherein the heat-curing epoxy resin composition is free from organic carboxylic acids.

19. The method of claim 1, wherein the heat-curing epoxy resin composition further comprises at least one chemical blowing agent.

20. The method of claim 1, wherein the heat-curing epoxy resin composition is free of an aromatic urea compound.

21. The method of claim 1, wherein the heat-cured epoxy resin composition provides an impact peel strength between the first and second heat-stable materials that is at least 15% higher than an impact peel strength of a similar heat-cured epoxy resin composition, which is formulated with components (A), (B), (D), (F), and (G), but not with component (C).

22. The method of claim 1, wherein a fracture energy of the heat-cured epoxy resin composition, as measured at 23° C. according to ISO 11343, is at least 16.3 J.

* * * * *